United States Patent [19]

Vogel

[11] 3,972,074
[45] July 27, 1976

[54] TAPE GUIDE ASSEMBLY FOR ROTATING HEAD

[75] Inventor: Charles A. Vogel, San Jose, Calif.

[73] Assignee: American Videonetics Corporation, Sunnyvale, Calif.

[22] Filed: Feb. 10, 1975

[21] Appl. No.: 548,236

[52] U.S. Cl. .............................................. 360/130
[51] Int. Cl.² ........................................ G11B 15/60
[58] Field of Search ....................... 360/130, 83–85

[56] References Cited
UNITED STATES PATENTS

| | | | |
|---|---|---|---|
| 3,159,501 | 12/1964 | Maxey | 360/84 |
| 3,207,855 | 9/1965 | Barger | 360/130 |

*Primary Examiner*—Robert S. Tupper
*Attorney, Agent, or Firm*—Flehr, Hohbach, Test, Albritton & Herbert

[57] ABSTRACT

A tape guide assembly for registering the record surface of a longitudinally moving record tape with respect to a transducer moving in a transverse plane crosswise to the direction of movement of the tape includes a female guide unit including a pair of axially spaced tape registration land surfaces formed as a portion of an imaginary cylinder and flanking the transverse plane of movement of the transducers moving crosswise of the tape. An elongate barrel, disposed coaxially with respect to the axis of rotation of the transducers and having arcuate surface portions lying in the foregoing imaginary cylinder, provides registration surfaces for a plurality of at least four surface portions carried by the female guide unit and disposed to lie also in the imaginary cylinder for engaging the barrel to properly register and support the land surfaces for guiding tape relative to the transducers.

4 Claims, 7 Drawing Figures

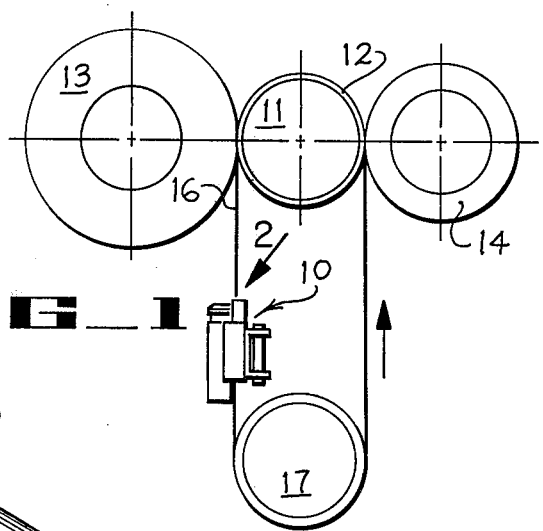
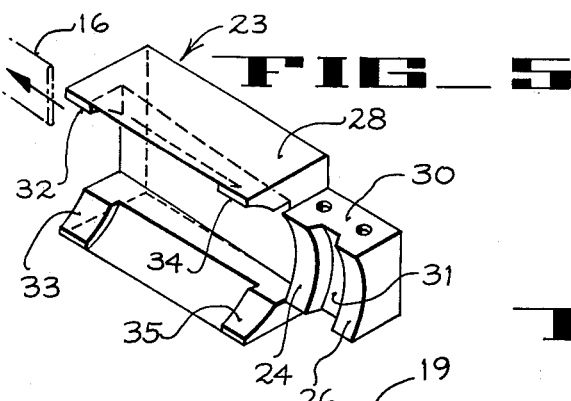
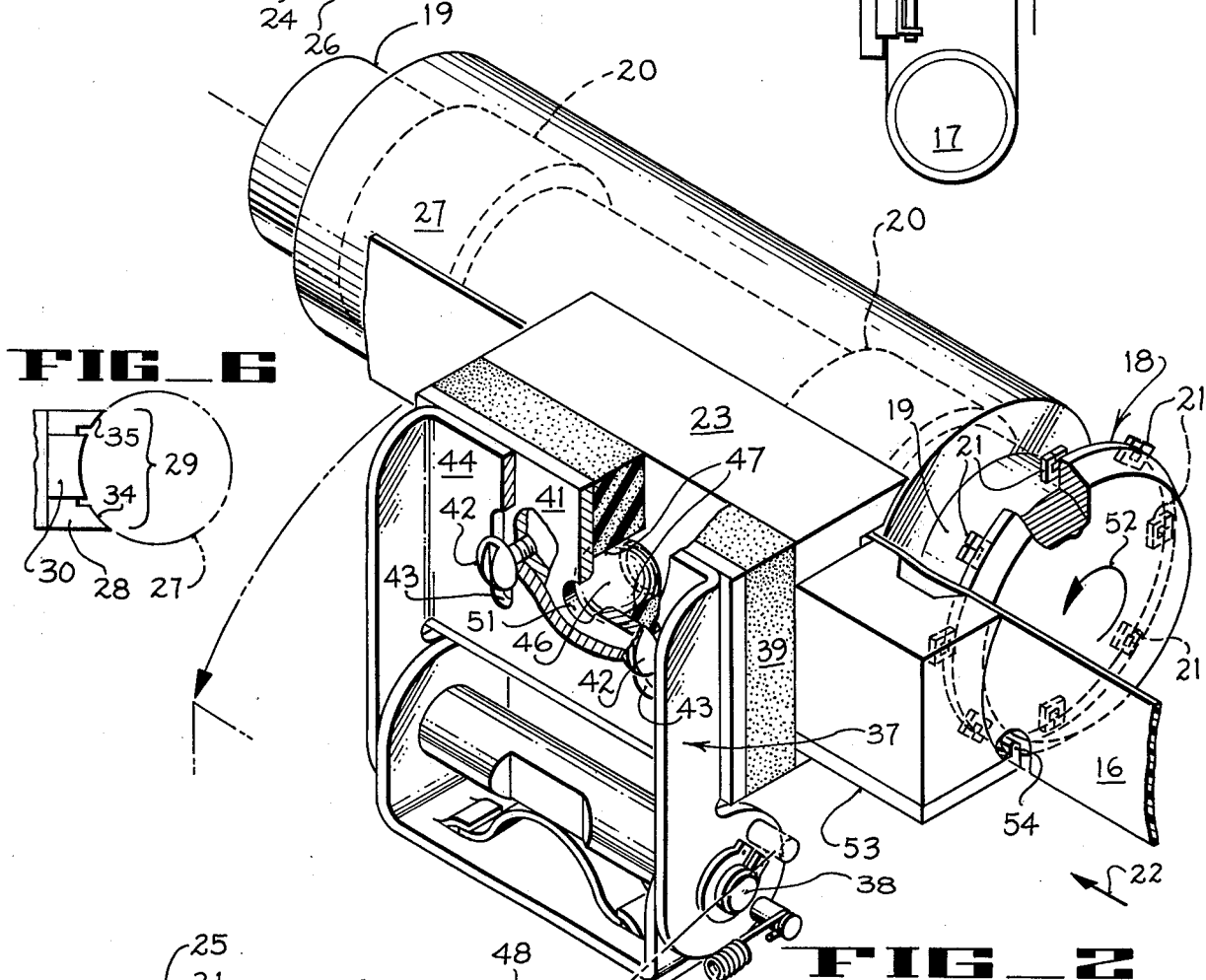
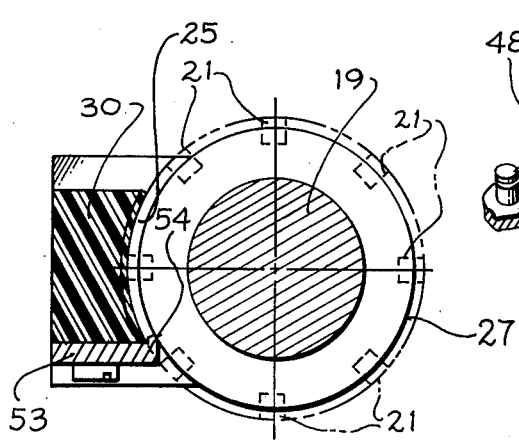
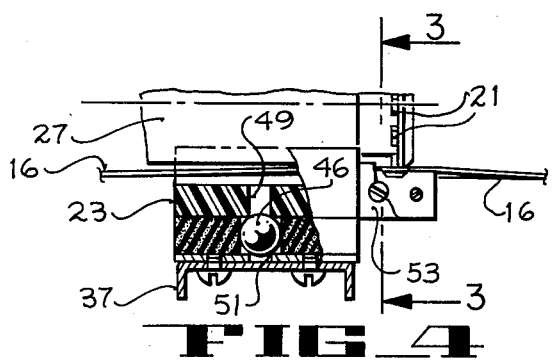

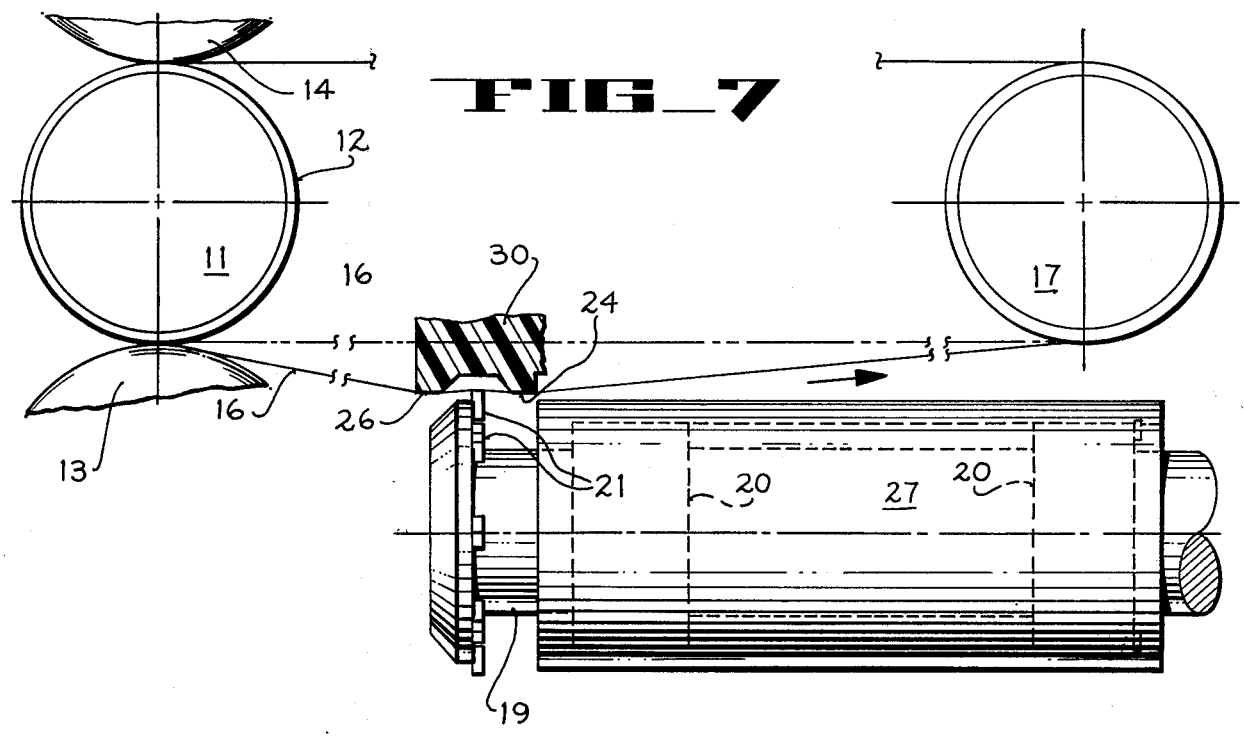

TAPE GUIDE ASSEMBLY FOR ROTATING HEAD

BACKGROUND OF THE INVENTION

This invention pertains to a tape guide for transverse scanning systems and more particularly to a tape guide assembly for use in conjunction with a transverse scanning system employing a female guide and registration means for extremely closely and accurately positioning the female guide tape registration lands to the path of transversely moving scanning heads.

Heretofore, in providing transverse scan systems in which a group of transducers is mounted upon an element rotating in a plane disposed transversely of a moving record tape, a significant problem has existed in making the critical alignments of the female guide reference radius (registration lands) with respect to the periphery of the path of the transducers in a manner whereby repeatable, accurate re-positioning of the guide can be achieved.

Heretofore, it has been necessary to make a number of separate adjustments which become difficult to quickly achieve. These adjustments also tend to become loosened with use of the machine whereby as the machine is used, the critical alignment noted tends to become misaligned thereby providing a poorer quality of recording.

SUMMARY OF THE INVENTION AND OBJECTS

In general, a tape guide assembly for a transverse scan system has been disclosed herein employing a female guide assembly characterized by four spaced surface portions lying in an imaginary cylinder having the same radius as the radius of registration lands which flank a gap through which a group of heads rotates in engagement with a moving tape passing across said gap. The spaced surface portions are formed to provide contact surfaces for engaging the cylindrical surface of a tape guide barrel. The guide barrel has the same radius as the lands. The barrel-contact surfaces lie in an extension of an imaginary cylinder including the critical tape registration lands. In addition, means are provided for moving the female guide into and out of engagement with the guide barrel. The female guide is mounted by means of a resilient coupling which serves to permit the female guide to twist and to tip in any direction in order to permit all of the cylindrical barrel-contact surface portions of the body of the female guide to contact the guide barrel and provide a uniform seating of the guide and alignment of the lands with the barrel surface.

In general, it is an object of the present invention to provide an improved tape guide assembly for a transverse recording head.

It is a further object of the invention to provide an improved tape guide assembly of the kind described utilizing means permitting self-registration of the critical tape registration lands with respect to the surface of a guide barrel.

Another object of the invention is to provide a female guide element for use in the above assembly in which the element can be readily formed without requiring reference to more than a single parameter, namely the radius of the registration land surfaces.

The foregoing and other objects will become more readily evident from the following detailed description of a preferred embodiment when considered in conjunction with drawings.

BRIEF DESCRIPTION OF THE DRAWINGS

FIG. 1 shows a schematic view of a tape transport system utilizing a tape guide assembly according to the invention;

FIG. 2 shows an enlarged perspective, schematic view partially broken away for clarity of a tape guide assembly according to the invention;

FIG. 3 shows in elevation section a schematic view taken along the line 33 of FIG. 2;

FIG. 4 shows a side elevation schematic view partially broken away of FIG. 2 according to the invention;

FIG. 5 shows a perspective detail view of a female guide unit employed in the assembly shown in FIG. 2;

FIG. 6 shows an end elevation view of the unit in FIG. 5 viewed from the right hand end thereof as shown;

FIG. 7 shows a diagrammatic side elevation view, partially in section, of a portion of the tape guide assembly showing the guide assembly in operation.

DETAILED DESCRIPTION OF A PREFERRED EMBODIMENT

A tape guide assembly 10 is shown in FIG. 1 incorporated into a tape transport system comprising a drive capstan 11 of a type having a resilient tire 12 on its outer surface to ride in engagement with supply and take-up rolls 13, 14. A length of tape 16 is drawn from supply roll 13 and fed through tape guide assembly 10. Tape 16 then passes around an idler roller 17 to return to take-up roll 14.

In the region of tape guide assembly 10, tape 16 is formed into an arcuate configuration so that the cross-section of the tape taken transversely of its direction of movement will define a portion of a circle, i.e., a circular arc.

Transducer means such as the head assembly 18 rotates with the end of a shaft 19 mounted in bearings 20. Assembly 18 carries a number of transducer elements 21 for transducing a track of information signals transversely across tape 16 during tape movement in the direction of arrow 22. Accordingly, transducer elements 21 rotate in a plane oriented normal to the direction of movement of tape 16 for engaging and transducing signals relative to the tape throughout the arcuate extent of the tape.

It should be readily evident that the foregoing general arrangement provides substantial problems in precisely registering the arcuate crosssectional configuration of the tape with the rotating transducers so that a full track will be properly transduced by each element 21. Typically, registration lands of a cylindrical configuration are disposed in flanking relation to the plane of movement of transducers 21 and the tape is made to ride across and conform to these registration surfaces (lands).

However, the problem heretofore has primarily been in being able to precisely locate and adjust the registration land surfaces. One advantage of the present construction is to be found in the fact that the land surfaces are provided in a manner which requires relatively little skill in the manufacture of a female guide unit 23 in which the critical registration land surfaces 24, 26 can be quickly, easily and repeatedly disposed relative to the periphery of the path of transducer elements 21.

Assembly 10 includes a cylindrical registration or guide barrel 27. The tape moves lengthwise alongside but spaced from barrel 27. Female guide unit 23 includes an elongate body portion 28 formed to include a generally cylindrical, relieved side portion 29 extending lengthwise of body portion 28.

The relieved side portion 29 of unit 23 is disposed to conform and cooperate with the cylindrical surface of barrel 27 so as to form a passageway for tape 16 to move in spaced relation alongside barrel 27 while retaining tape 16 as the tape moves lengthwise of barrel 27.

Unit 23 includes a body extension portion 30 which includes a pair of cylindrically shaped registration lands 24, 26 disposed in flanking relation with respect to a groove 31 serving to accommodate the passage of head elements 21 between lands 24, 26. Accordingly, as tape 16 moves between barrel 27 and the relieved side of unit 23, the reverse surface of tape 16 engages and registers with lands 24, 26.

Transducer elements 21 rotate in a circular path having a predetermined radius. The radius of lands 24, 26 is sufficiently less than the radius of rotation of elements 21 so as to cause elements 21 to uniformly engage and transduce a path crosswise of tape 16.

Means are provided for registering the guide surfaces of lands 24, 26 in an imaginary cylindrical surface extending coaxially from the cylindrical surface of barrel 27 as now to be described.

A plurality of pairs of cylindrical barrel-contact surface portions 32, 33, 34, 35, referred to hereinafter as alignment pads, are formed integral to and carried by body portion 28. Each of pads 32–35 has a radius corresponding to the radius of and formed about the same center as the radius of lands 24, 26. The pads are arranged in pairs wherein the surface portions of each pair are disposed to engage barrel 27 at opposite side edges of tape 16. One of the pairs of pads 32–35 is displaced axially of barrel 27 relative to the other pair of pads.

Further, it is readily evident that, from examination of unit 23, the only critical concern in its manufacture is to insure that the radius of lands 24, 26 and pads 32–35 corresponds to the radius of the periphery of barrel 27.

It has been observed that, by use of four support surfaces shown in unit 23, female guide unit 23 will engage barrel 27 firmly, rigidly and squarely so as to provide repeatable positioning of guide unit 23 relative to barrel 27 and thereby provide repeatable positioning with respect to lands 24, 26 and tape 16.

In order to provide consistent, repeatable performance, barrel 27 typically is manufactured from a rigid material, such as aluminum, as is guide unit 23 so as to match the rate of thermal expansion of the barrel with temperature changes.

Further, means movable between advanced and retracted positions have been provided for manually carrying unit 23 into and out of engagement with barrel 27. A resilient coupling is interposed between the last named means and unit 23 to permit unit 23 to twist and tip in all directions relative to barrel 27 so as to permit all pads 32–35 to simultaneously engage and register with barrel 27.

Accordingly, as shown best in FIG. 2, a hinged support bracket 37 pivots about the axis of a pivot pin 38 to carry unit 23 between advanced and retracted positions relative to the surface of barrel 27.

A layer 39 of resilient, compressible material, such as foam rubber, is adhered between the back surface of unit 23 and a mounting plate 41. Mounting plate 41 is, in turn, secured as by means of screws 42 disposed in gross adjustment openings 43 formed in the web 44 of bracket 37.

A spherical rigid force-transmitting bearing element 46, contained within an opening 47 formed within layer 39 centrally of pads 32–35, serves to apply compressive force to pads 32–35 when bracket 37 is subjected to the force of a spring load, such as provided by the spring 48.

By applying forces centrally via the spherical bearing element 46, it is possible to provide an even application of forces to each of pads 32–35 while, at the same time, permitting twisting movement and tipping movement of unit 23 relative to bracket 37.

Opposed drilled holes 49, 51 formed respectively through the back wall of unit 23 and through plate 41 form a seat for bearing element 46 so as to additionally aid in retaining element 46. By using the element 46 in conjunction with the registration action of pads 32–35 cooperating with barrel 27, the female guide 23 can be located in one and only one place. Further, location is positive in all directions.

From the foregoing, it will be readily evident that the problem of maintaining physical alignment and uniformly closed spacing between female guide reference surfaces as defined by lands 24, 26 can be very accurately achieved in a very simple manner utilizing the four barrel-contact support surfaces 32–35 formed in the same imaginary cylinder as contains lands 24, 26.

As unit 23 is moved toward drum 27, tape 16 is captured therebetween and by means of the resilient coupling formed by the layer 39 of foam rubber, all four pads 32–35 readily align themselves with regard to the surface of barrel 27 and, hence, automatically align lands 24, 26 properly with respect to head assembly 18.

Finally, as head assembly 18 rotates in the direction of arrow 52, it should be readily evident that tape 16 would normally tend to be crowded counterclockwise (as shown in FIG. 3). In order to prevent this from occurring, a bifurcated retainer element 53 secured to body extension portion 30 disposes a pair of axially spaced and inwardly directed lips 54 beneath and immediately alongside the edge of tape 16 in position flanking the transverse plane of movement of transducer elements 21.

Accordingly, any sidewise movement of tape 16 is precluded by the presence of retainer 53 and its associated lips 54. Lips 54 extend only slightly beneath tape 16 so that as unit 23 is retracted away from barrel 27, the flexing of tape 16 permits the tape so slide free of lips 54.

From the foregoing, it will be readily evident that there has been provided an improved tape guide assembly which can be made simply and to a high degree of precision simply by manufacturing the unit to make the radius of pads 32–35 to conform precisely with the radius of the surfaces of lands 24, 26, and this can be done automatically simply by forming all arcuate surfaces at the same time by the same tool. This precision-forming of unit 23 is not related to any other reference point as is typically required in the prior art.

Further, it is evident that the resilient coupling 39 interposed between the hinged mounting bracket 37 and female guide unit 23 serves to capture and retain bearing element 46 while also providing a resilient coupling permitting female guide unit 23 to twist about the axis of applied force acting through bearing element 46 as well as to permit female guide unit 23 to tip in any direction to allow all four pads 32–35 to register with the side of scanner barrel 27.

Finally, as shown in FIG. 7, the tape never contacts barrel 27 since the function of barrel 27 is to provide a proper registration surface for supporting lands 24, 26 at an accurate, repeatable position relative to the path of the transducers 21.

I claim:

1. A tape guide assembly for registering one side of a longitudinally moving record tape with a transducer moving in a plane disposed crosswise to the direction of movement of the tape, said guide assembly comprising a cylindrical barrel disposed alongside the path of said tape with the tape moving lengthwise of and in spaced relation to said barrel, said transducer rotating coaxially of said barrel in a transverse plane at a predetermined radius therein, a female guide including an elongate body portion having a relieved side portion confronting said barrel with the tape moving lengthwise between and in spaced relation to said relieved side portion and said, a pair of cylindrically shaped registration lands carried by said body portion and flanking said transverse plane, said registration lands engaging and registering the other side of said tape, the radius of said lands being sufficiently less than said predetermined radius to cause said transducer to uniformly engage and transduce a path crosswise of said tape, a plurality of pairs of surface portions carried by said body portion, each of the last named surface portions lying in an imaginary cylinder having a radius corresponding to the radius of said lands and taken about a center common to said lands and said surface portions, said surface portions of each pair engaging said barrel adjacent opposite edges of the tape, one said pair being displaced axially along said barrel from another said pair.

2. In a tape guide assembly according to claim 1 comprising means mounting said body portion for movement between advanced and retracted positions for carrying said body portion into and out of operative engagement with said barrel, resilient coupling means interposed between the last named said means and said body portion to permit said body portion to twist and tip relative to the last named said means to permit all said surface portions of said plurality of pairs thereof to simultaneously engage said barrel.

3. In a tape guide assembly according to claim 2 in which said coupling means comprises a layer of resilient, compressible material between said body portion and the last named said means, and a bearing element contained by said layer and disposed centrally of said pairs of surface portions for applying a compressive force thereto from said last named means thereby registering said lands in an imaginary cylindrical surface including said pairs of surface portions.

4. A tape guide assembly for registering one surface of a longitudinally moving record tape with a transducer moving in a transverse plane crosswise to the direction of movement of the tape, said guide assembly comprising a longitudinally extending cylindrical barrel disposed alongside the path of said tape, the plane of said transducer movement being disposed in axially spaced relation from an end of said barrel, said transducer rotating coaxially of said barrel in said transverse plane at a predetermined radius therein, a female guide including an elongate body portion formed to include a relieved side portion confronting said barrel and cooperating therewith to form a passageway through which the tape moves in spaced relation to said barrel and said body portion, a body extension portion including a pair of axially spaced tape registration land surfaces formed as a portion of an imaginary cylinder extending lengthwise from and including the cylindrical surface of said barrel, said land surfaces flanking said transverse plane and engaging the other surface of the tape, a plurality of barrel-contact support surfaces carried by said body portion and engaging said barrel, the support surfaces lying in said imaginary cylinder to register said land surfaces in the same imaginary cylindrical surface as said barrel when said support surfaces engage said barrel.

* * * * *